Figure 5:
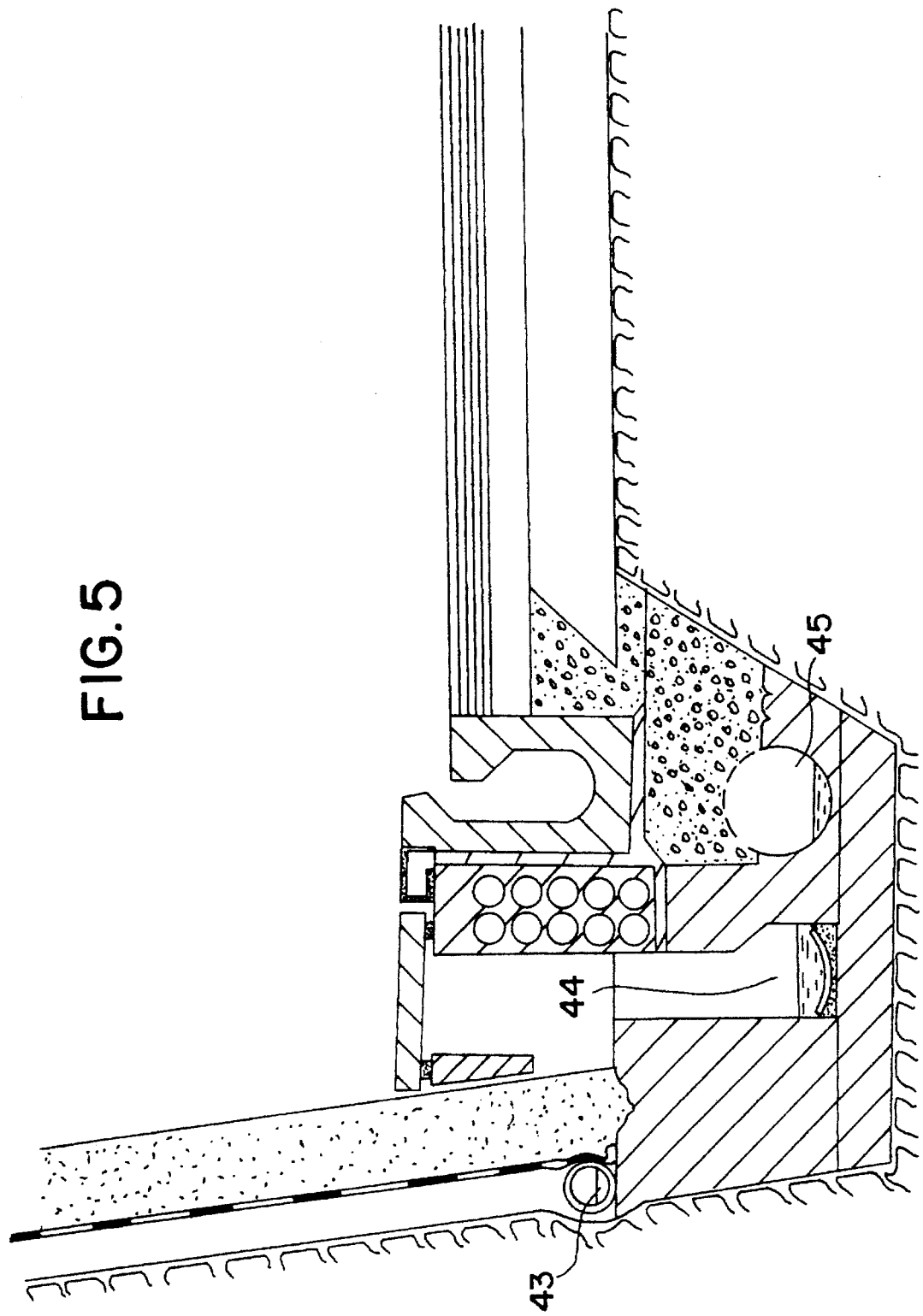

United States Patent [19]

Wegmüller

[11] Patent Number: 5,510,038
[45] Date of Patent: Apr. 23, 1996

[54] PROCESS FOR PREVENTING THE FORMATION OF DEPOSITS IN A CONSTRUCTION DRAINAGE SYSTEM

[76] Inventor: Marcel C. Wegmüller, Gundeldingerrain 51, CH-4059 Basel, Switzerland

[21] Appl. No.: 322,235

[22] Filed: Oct. 13, 1994

[30] Foreign Application Priority Data

Feb. 17, 1993 [WO] WIPO ............... PCT/CH9400029

[51] Int. Cl.$^6$ ..................................................... C02F 5/10
[52] U.S. Cl. ........................ 210/698; 210/696; 422/14
[58] Field of Search ........................ 422/14, 15, 16, 422/17, 18; 210/696–701

[56] References Cited

U.S. PATENT DOCUMENTS 3,917,530  11/1975  Boske ............................... 210/698
4,741,400   5/1988  Underdown .
5,057,228  10/1991  Breen et al. .

FOREIGN PATENT DOCUMENTS

0299777A2  1/1989  European Pat. Off. .
2254615   10/1992  United Kingdom .

*Primary Examiner*—Timothy M. McMahon
*Attorney, Agent, or Firm*—Robert A. Miller; James J. Drake

[57] ABSTRACT

In drainage systems in buildings and excavations there is waste and ground water with a high dissolved material content. These mainly inorganic substances often cause the build-up of hard deposits in the water conveying parts of the drainage systems, e.g. waste water pipes. These deposits reduce the drainage cross section of the drainage systems thus preventing the water from flowing freely and thus causing back-ups which can result in considerable damage. The current processes of removing these deposits are electro-mechanical cleaning and high-pressure rinsing or abrading with water. These processes are laborious, expensive and cause interruptions in operation. It is the aim of the invention to prevent the formation of such deposits. To this end, a conditioning agent in aqueous form is added via a metering installation at one or more points in the drainage system. The conditioning agent is mixed with the water arriving at the next channel and prevents the dissolved substances from separating out and causing deposits.

8 Claims, 3 Drawing Sheets

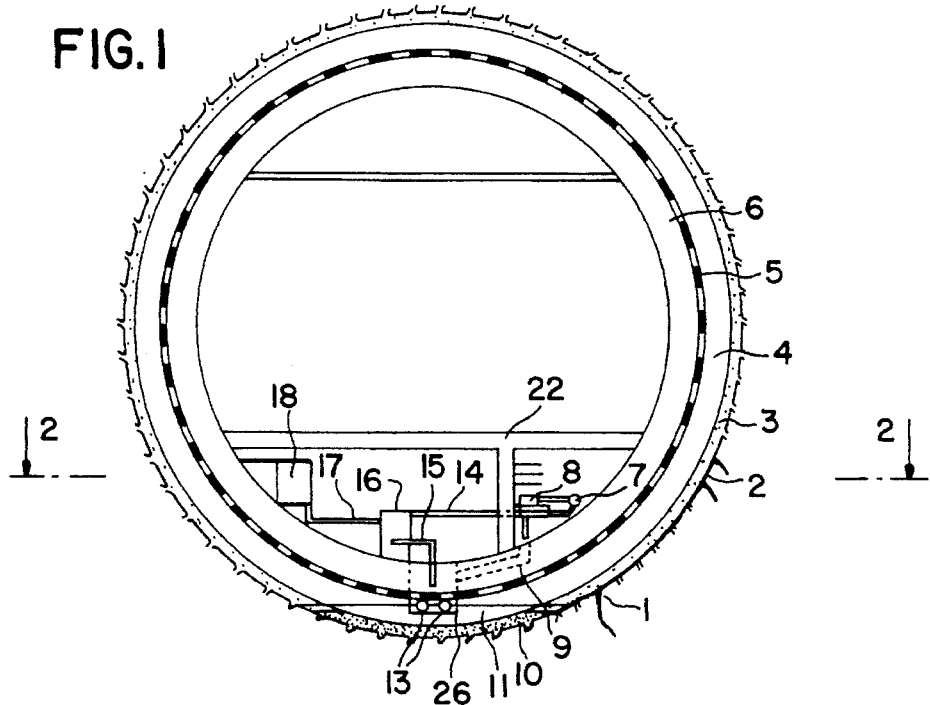
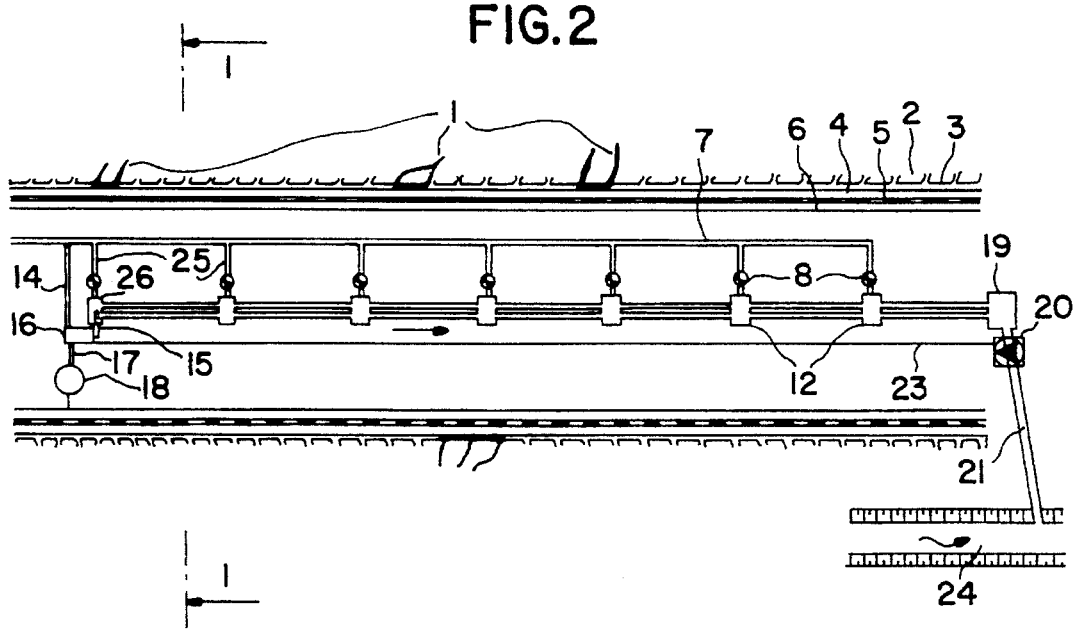

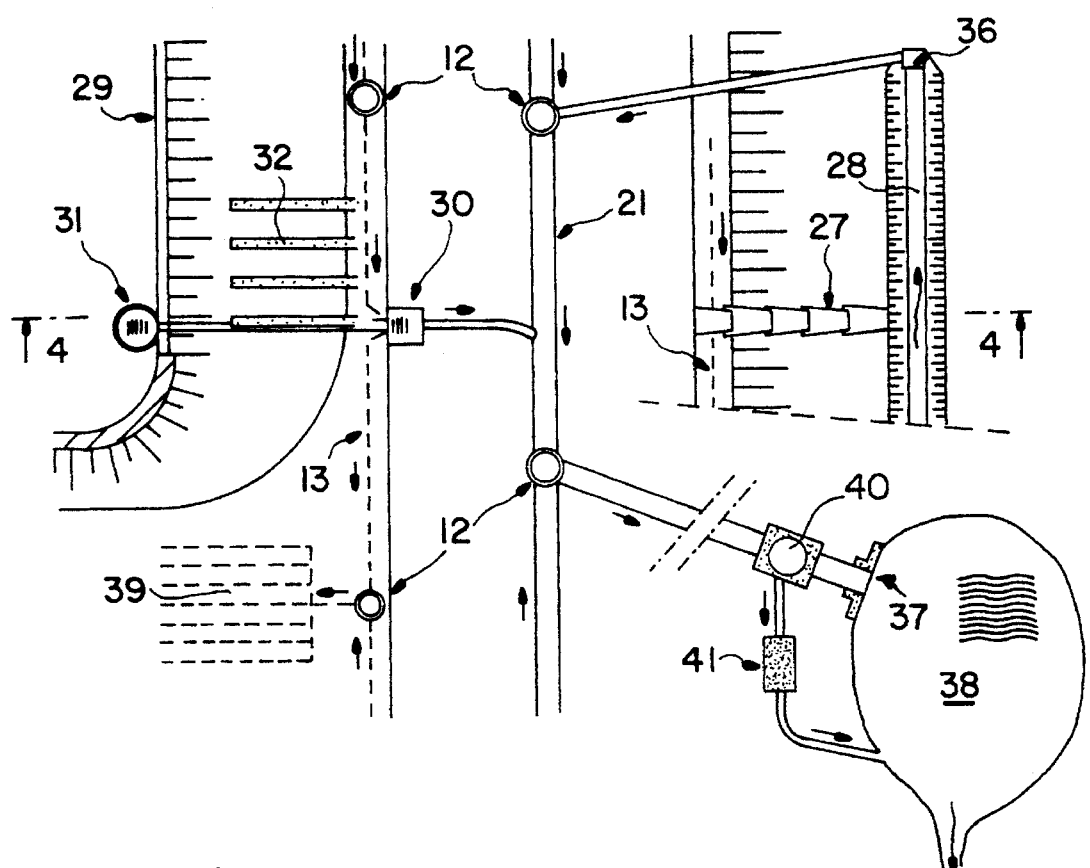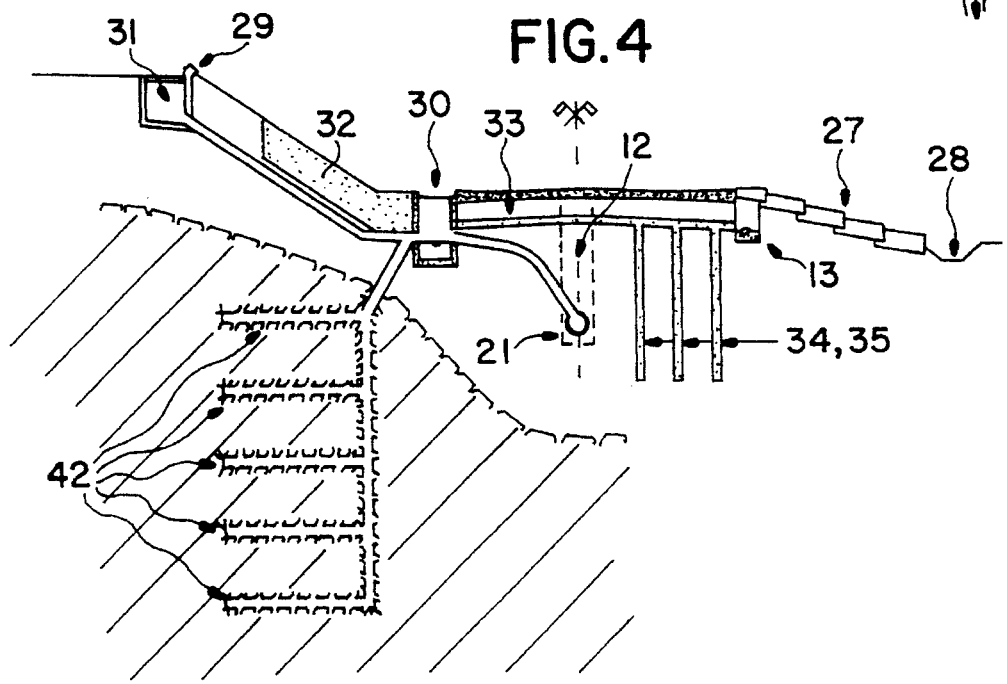

PROCESS FOR PREVENTING THE FORMATION OF DEPOSITS IN A CONSTRUCTION DRAINAGE SYSTEM

The invention relates to a process for preventing the formation of deposits in a construction drainage system. Such above-ground and subterranean constructions work may be infrastructural installations such as buildings, tunnels, galleries, caverns, barrages, retention basins, hydroelectric power plants, earth dams, retaining walls, road construction work, slope drainage systems, well containments or provisional construction pits.

The drainage of above- and below-ground constructions involves ground water and infiltration water containing varying amounts of dissolved substances. Predominantly inorganic in nature, these materials frequently give rise to hard deposits. As the ground and infiltration water enters the drainage systems, their physical environment changes, causing the dissolved substances to form hard and firmly adhering deposits, which may be in an amorphous or crystalline form. These incrustations (scale formations) usually consist of calcium carbonate, magnesium carbonate, calcium sulphate (gypsum), silicates ($SiO_2$), barium sulphate and iron oxides, all of these possibly in their hydratized form.

These hard and firmly adhering deposits reduce the flow cross section and, in extreme cases, may in fact occlude it completely. As a consequence, the water entering the system cannot discharge from it freely and will clame up, which may cause major damage. In structures of which the stability depends on a perfectly operating drainage system, deposits of the aforesaid kind may have fatal consequences.

The methods most frequently employed presently to remove such deposits are: electromechanical cleaning using special tooling, high-pressure flushing or high-pressure water abrasion. These methods are costly, labour intensive and frequently cause undesirable downtimes.

For these reasons, the industry has long sought a process which reduces or prevents the formation of deposits of the aforesaid kind. The Vereinigung Schweizer Strassenfachleute (VSS; Association of Swiss Road Experts) has commissioned research (VSS Research Commission 16/90; Incrustations in Construction Drainage Systems). In its October 1990 interim report, the group handling the task concludes that, in particular, the materials used and their surface finish exerted a major influence on the growth rate of deposits on water-guiding components. The report says that the only way of inhibiting the formation of hard deposits was the implementation of suitable design measures. To this end, the report recommends to keep the discharging water as quiet as possible and to provide the water-conducting components with a smooth surface so as to inhibit deposit adhesion.

The present invention relates to a process for preventing the formation of deposits in construction drainage systems which is characterized by the addition of a conditioning agent to the infiltration or groundwater to be discharged. The present invention also relates to a device for practicing the aforesaid process using a dosage system (16) serving to feed suitable amounts of the conditioning agent into a construction drainage system. Adding a conditioning agent to the water to be treated will prevent the growth of crystal nuclei, thus making the formation of hard deposits impossible.

Depending on the way they act, conditioning agents of this kind for aqueous systems have been given various names, such as dispersants, hardness stabilizers, protective colloids and crystal growth deactivators (see Held and Bohnsack, "Kühlwasser", 3rd edition 1984, Vulkan-Verlag, p. 220 et seq.); they include sequestering agents (complex formers) and other surface-active materials (tensides). Of particular importance are hardness stabilizers, i.e. compounds which are suited for stabilizing the hardness forming materials in drainage systems while they deactivate the growth of crystals and, mostly, have surfactant properties, as well as dispersing agents (dispersants). Dispersants are surface-active agents which disperse—i.e. maintain in a finely distributed condition—undissolved solid particles in the water, also in the colloidal range. Conditioning agents are added to the construction drainage system—preferably in an aqueous solution—in amounts of 0.1 to 100 g per cubic meter, especially 0.5 to 50 g per cubic meter of infiltration or ground water. Conditioning agents may be used singly or in mixtures.

The effects of hardness stabilizers and dispersants frequently overlap. For this reason, the conditioning agents preferably are combinations of hardness stabilizers and dispersants, with the efficiency in that case usually being higher than if the components are used individually. Also, conditioning agents may contain further suitable additives; however, for the treatment of the infiltration or ground water to be discharged, the decisive point is that the use of a specific conditioning agent or of a mix of conditing agents should prevent the formation of incrustations in an environmentally acceptable manner.

For exemplary conditioning agents suited for use in the inventive process, see Held and Bohnsack, loc. cit., pp. 200–239.

In addition to the conditioning agents for aqueous systems which the above publication describes, numerous other compounds and mixtures of compounds are suited for use in the inventive process.

For stabilizing the hardness forming substances—i.e. for use as hardness stabilizers—the following materials may be used in a construction drainage system: inorganic condensed phosphates such as alkali di-, tri- and polyphosphates, organic phosphorus compounds such as organic phosphonic acids, e.g. 2-methyl-propanephosphonic acid or hydroxyethylidene diphosphonic acid, phosphate esters, polyphosphoric acid esters, aminophosphates, aminomethylenephosphoric acids, N-containing phosphonates such as aminophosphonates, aminoalkylenephosphonic acids such as aminotri(methylenephosphonic acid) or diethylenetriaminopenta(methylenephosphonic acid), poly(aminomethylene-phosphonates) or hydroxyethyl-ethylene(di(aminomethylene)phosphonic acid), as well as phosphonocarboxylic acids such as phosphonobutane-tricarboxylic acid (e.g. as described in German Patent 27 20 551), succinic acid amide, carbohydrates, polysaccharides, gluconates, polyglycosides such as polyglucosides and their derivatives, polyoxycarboxylic acids and their copolymers, oxidized carbohydrates such as oxidized cellulose, starch or dextrin, proteins and other protein products such as polyaspartic acid, silicates such as alkali silicates, water glass and zeolites. Water-soluble salts of corresponding acids are suited also.

Among the materials suited for use as dispersants in a construction drainage system are tannin derivatives such as sulphitized tannins, lignin sulphonates, sulphonated condensation products of naphthalene with formaldehyde, anionic polyelectrolytes such as acrylate-based polymers such as polyacrylates, polymethacrylates, polyacrylamides and copolymers of acrylic acid or methacrylic acid and acrylamide, further P-containing polymeric compounds such as N-phosphomethyl-macrocyclic polyethers or phosphonomethylated oxyalkylene amines, as well as phosphinic acid-containing homo- and copolymers of acrylic acid and acrylamide (such as are described in European Patent Application 517 470) and oligomeric phosphinico-succinic acid compounds (such as are described in U.S. Pat. No. 4,088,678 and in European Patent Application 454 323). Also suited are polymers containing N-substituted amide functions such as sulphomethylated or sulphoethylated polyacrylamides and polymethacrylamides and copolymers or terpolymers with acrylic acid and maleic acid esters, N-butylacrylamide and its copolymers and acrylamidopropionosulphonic acid in salt form and its copolymers, as well as phosphinoalkylated acrylamide polymers and copolymers with acrylic acid, copolymers of alkenes with unsaturated dicarboxylic acids and maleic acid-based polymers and copolymers. These and similar compounds are described e.g. in European Patent Applications 225 596, 238 852, 238 853, 238 729, 265 846, 310 099, 314 083, 330 876, or 517 470. Water-soluble salts of the corresponding acids are suited also.

Among others, the following materials are suited for use as sequestering agents (complex formers) in a construction drainage system: nitrilotriacetic acid, citric acid, ethylene diaminetetraacetic acid (EDTA), ethercarboxylates and oxidized carbohydrates such as partially hydrolyzed and oxidized starch or dextrin (as described e.g. by F. Trulli and E. Santacesaria in Chimicaoggi, May 1993).

Conditioning agents or mixtures of conditing agents which are suited for the inventive process may contain further additives such as aluminate compounds (as described e.g. in European Patent Application 302 522), stabilizers such as polyquaternary amines such as poly(dimethylamino-coepichlorohydrin) or poly(diallyldimethyl-ammonium chloride) (as described in U.S. Pat. No. 5,038,861), or suitable tensides such as alkylarylsulphonates, polyvinylsulphonates, sodiummethoxymethylcellulose, etc.

Particularly suited for use as a conditioning agent is a mixture of sodium salts of polycarboxylic acids and phosphonocarboxylic acids in an aqueous solution in amounts of 0.5 to 50 grams per cubic meter of infiltration or ground water (as commercially available as Nalco 7311 Plus ® from the firm of Deutsche Nalco-Chemie GmbH., of Frankfurt a.M., Germany), or a mixture of aminotri(methylenephosphonic acid), polyacrylic acid and Na salt in amounts of 1 to 50 grams per cubic meter of infiltration or ground water (as commercially available as Clarafos 161 ® from the firm of Chemische Fabrik Budenheim, of Budenheim, Germany). Also suited are other commercially available products, such as a mixture of medium chain length high dissolution rate food-grade sodium polyphosphate in an aqueous solution as it is available under the name of Quantophos P4 ® from the firm of Benckiser Wassertechnik GmbH., of Schriesheim, Germany. If desired, combinations of these commercial products may be used. However, all the aforesaid conditioning agents are suited individually or in any combination for use in the inventive process.

Once the volume of water to be treated and its chemistry are known, it is possible to calculate the amount of conditioning agent which is needed to prevent the formation of deposits in a drainage system. This amount can in fact also be determined empirically, if this should be necessary.

The invention will now be explained in greater detail with reference to drawings which illustrate a practical example and a comparison test.

FIG. 1

FIG. 1 schematically shows the cross section of a road tunnel through a rock which would be suited to the application of the inventive process. The view corresponds to a section taken at the level of line B—B in FIG. 2. This illustration belongs to example 1. It shows the infiltration and ground water 1, the rock 2, the annular gap backfill 3, the outer ring 4, the peripheral seal 5, the inner ring 6, the main (service water) line 7, the time-controlled valves 8, a drainage pipe 9, the mortar bed 10, the mountain water 11, the inspection shafts (man holes) 12, the seepage pipes 13, a (service water) pipe 14, the feed line 15, the dosage unit 16, the conditioning agent feeder 17, the supply reservoir 18, the inspection shaft 19, a measuring weir or a comparable installation 20, the collecting pipe 21, the carriageway slab 22, the cable link 23, the main outlet canal 24, service water connections 25 and the first shaft 26 in the drainage line.

FIG. 2

FIG. 2 schematically shows a simplified view of the tunnel drainage system by way of a section taken at the level of line A—A in FIG. 1. This view belongs to example 1.

FIG. 3

FIG. 3 schematically shows the presently most common elements of drainage systems. This view belongs to example 1.

FIG. 4

FIG. 4 schematically shows the presently most common elements of drainage systems by way of a section taken at the level of line A—A in FIG. 3. This view belongs to example 1.

Together with FIG. 4, FIG. 3 shows all the essential elements a drainage system may comprise. The elements of the surface drainage system are channels 27, ditches 28, terminations 29, sludge collectors 30 as well as inlet shafts 31. The drainage elements proper are seepage ditches 32, seepage lines 13 having a perforate wall such as unjointed, perforated or slotted pipes, rubble drains, seepage layers 33, sand drains 34 such as infiltration systems composed of sand layers, geodrains 35 such as seepage installations comprising plastics or geotextiles, as well as drainage holes drilled into the rock 42. The sewage elements are collecting lines 21 intended to receive and take away the entire infiltration and ground water fed to them by submains from a section of the drainage system, as well as inspection shafts 12 and inlet works 36. The outlet elements are discharge works 37, retention basins 38, infiltration installations 39, a rain spillway 40 and an oil separator 41.

The following elements are especially suited for the inventive process to prevent the formation of deposits in a construction drainage system: Water flow in a channel 27 or in a ditch 28 or in a termination 29 or in a drainage ditch 32 or in a seepage pipe 13 or in a collecting line 21 because this is where the conditioning agent can be added by means of metering equipment without problems at the highest point of the respective element.

FIG. 5

FIG. 5 shows a cross-section through the N13 Isla Bella highway tunnel in Switzerland, that section taken in the area of the walkway cantilever slab. The view shows the arrangement of the various drainage lines in this tunnel. This view belongs to the comparison test. It shows the insulation seepage pipe 43, transport pipe 44 and drainage pipe 45.

Example 1

In the first example, as shown in FIGS. 1 and 2, the conditioning agent is supplied by means of dosage equipment 16 via a feed line 15 of a plastics material into the first shaft 26 of seepage pipes 13. An appropriate amount of the agent is provided by means of dosage unit 16 via feed line 15 to the drainage system, preferably at the highest point of seepage pipes 13. The amount of treating agent depends on the volume and the chemistry of the mountain water to be treated.

For determining the chemistry of the mountain water to be treated, water samples should be taken directly inside the tunnel at various location along the tunnel axis—e.g. from bore holes, making sure that the mountain water cannot release $CO_2$ in the process; if it did, the results of the chemical analysis would not reflect the actual conditions existing. The chemical analysis should provide at least the following values: total hardness °dH (dH=German hardness), carbonate hardness °dH, the m value, the Ca hardness °dH, the electrical conductivity (µs/cm), the pH level, sulphate (mg/liter), chloride (mg/liter), sodium (mg/liter). Using the Ryznar approach, these values can be used to calculate a stability index which forms the basis for computing the minimum dosage of the treating agent. In the case of hard mountain water having a total hardness of 40 °dH and a carbonate hardness of 20 °dH, and using the aforesaid commercial product Nalco 7311 Plus ®, the recommended dosage accordingly is approx. 5 g of the conditioning agent per cubic meter. For other conditioning agents, the dosage should be re-calculated on a case-by-case basis.

For distributing the conditioning agent, it is recommended to dilute it with service water. Further, dilution will be necessary if initial portions of the seepage pipes do not continuously receive mountain water, causing at least part of them to run dry. In this case, the dosage unit 16 should be provided with a service water inlet 14 to allow the conditioning agent to be diluted with service water in any desired ratio for subsequent introduction into the drainage system. In case the seepage pipes run dry in the area of the dosage unit, the conditioning agent should be diluted with service water to obtain a feed input to first shaft 26 of not less than 1 liter/hr. so that evaporation cannot prevent the agent from effectively mixing with the mountain water. In many drainage systems the total volume of mountain water to be treated varies strongly (e.g. in dependence on regional rainfall). In these instances, it is worth the effort of controlling dosage unit 16 in dependence on the water flow at the end of the drainage system. This manner of controlling is particularly important if that volume fluctuates greatly with time.

Most of such tunnel drainage systems have an enlarged inspection shaft 19 at the end of the system. In such a shaft, the mountain water is diverted to drainage channel 21 and—as shown in FIG. 2—passed on to a main outlet canal 24.

A measuring weir 20 or a comparable installation may be provided at a suitable location along drainage channel 21 to determine the volume of water passing by at periodic intervals and to pass the measured values on to dosage unit 16 on a cable link 23. This enables dosage unit 16 to supply to the drainage system precisely the amount of conditioning agent which is needed for the product concentration in the water to reach the desired value at the end of the drainage line.

In case the water is very hard and correspondingly high amounts of the conditioning agent are added, part of the salts dissolved in the water may precipitate in the form of amorphous sediments. If uneven areas exist, or if the cross sectional configuration changes inside the pipes, these areas or changes may interfere with the discharge by depositing the precipitants at the bottom of seepage pipe 13 so that, in time, they form hard incrustations as well. In order to keep this kind of incrustations from forming, all sections of the seepage pipes are flushed with service water in intervals of 3 to 5 days. In order to consume as little service water as possible to this end and to optimize the cleaning effect in the drainage system, permanent service water connections 25 from the main service water line 7 may be provided at several shafts affording free access to the continuous drainage line. A time-controlled valve 8 is provided at each one of these connections. These time-controlled valves can be adjusted as needed; thus, in low-precipitation periods, the drainage line can be flushed using only part of time-controlled valves 8 while the unused valves are cut off. The flushing operation is used to carry away both the amorphous sediments precipitated from the mountain water and undissolved substances the mountain water contains in the form of ultrafine solids.

Comparison Test

A test was performed with respect to the prevention of deposits in one of the drainage lines (righthand transport line, looking towards Chur) in the Isla Bella Tunnel of Swiss national highway N 13. Since this tunnel was built, thick and hard layers of incrustations used to form in this drainage line to a thickness of up to 2 cm per year, calling for periodic removal using very expensive maintenance methods. In order to perform this and other maintenance work, the tunnel is closed to traffic at night for two weeks each year. FIG. 5 shows a cross section through the Isla Bella highway tunnel in the area of the walkway bracket and the various drainage lines. Insulation seepage pipe 43 collects the mountain water emerging behind the insulation and passes it on via a shaft to transport pipe 44 at regular intervals. Drainage pipe 45 underneath the termination of the roadway edge had no relevance to the test. This arrangement of the highway cross section applies to both the right and the left sides of the tunnel. In order to determine the test parameters, water and deposit samples were taken at various locations in the tunnel. Chemical analysis of the water samples produced the following results:

| Sampling locations: | |
|---|---|
| No. 1: | End of the transport line, before the northern portal (maximum amount of mountain water) |
| No. 2: | Center of the transport line in the middle of the tunnel (mean amount of mountain water) |
| No. 3: | Beginning of the transport line (southern portal) near the dosage equipment (minimum amount of mountain water) |

|  | No. 1 | No. 2 | No. 3 |
|---|---|---|---|
| pH | 7.6 | 7.6 | 7.6 |
| El. conductivity (µs/cm) | 704 | 692 | 680 |
| m value (Ks 4.3/mmol/l) | 5.7 | 6.0 | 6.8 |
| Ca hardness (°dH) | 10.9 | 12.3 | 13.1 |
| Iron (mg/liter) | 0.05 | 0.04 | 0.03 |
| Sulphate (mg/liter) | 90 | 55 | 108 |
| Ryznar stability index | 6.8 | 6.6 | 6.5 |
| Langelier saturation index | 0.4 | 0.5 | 0.5 |

Chemical analysis of 4 deposit samples (samples nos. 1 to 4) taken at increasing distances from the southern portal of the transport line produced the following results (in percent):

| Sample No. | 1 | 2 | 3 | 4 |
| --- | --- | --- | --- | --- |
| Glow loss (at 900° C.) | 43.8 | 43.2 | 43.3 | 43.5 |
| Silica ($SiO_2$) | 0.4 | 0.7 | 0.2 | 0.7 |
| Iron oxide ($Fe_2O_3$) | 0.24 | 0.65 | 0.49 | 0.47 |
| Calcium oxide (CaO) | 50.7 | 51.2 | 51.2 | 53.5 |
| Magnesium oxide (MgO) | 0.6 | 0.8 | 0.7 | 0.9 |

These analysis results allowed the following conclusion to be drawn: The Ca hardness of the seepage water clearly is lower at the end of the tunnel than at the center of the tunnel; the 1°dH difference corresponds to the deposition of approx. 18 g $CaCO_3$ per cubic meter of mountain water. All deposit samples clearly show the almost exclusive formation of $CaCO_3$. In addition, minor amounts of magnesium salts and iron salts and some silicate were found. No difficult-to-dissolve phosphate and sulphate compounds were found. In each case, the Ryznar index was higher than 6.0; accordingly, the mountain water only had a slight tendency to form deposits. In contrast, the Langelier index had values >0, clearly showing the formation of calcium deposits. The test configuration was selected on the basis of these results.

From the southern portal, the roadway inside the tunnel (and the two transport lines) ascends for the initial 300 meters, followed by a change in the longitudinal gradient which determine the mountain water flow towards the northern portal. A transport line 44 runs under each one of the righthand and lefthand walkways to receive the mountain water collected in insulation seepage pipe 43 and to take it away towards the northern portal. After the change in the longitudinal gradient, a dosage unit was installed inside the first niche on the righthand side (looking towards Chur). The unit comprised a wall-mounting fiberglass-reinforced plastic case holding a metering pump, a suction tube, a metering valve, a timer, the dosage monitoring system and a no-dosage alarm. The conditioning agent was fed from the dosage unit through a flexible polyethylene tube into the nearest inlet shaft. The intention was to stabilize the mountain water received by transport seepage line 44 from insulation seepage pipe 43 until it exits the tunnel at the northern portal. The mountain water volume on the righthand side of the tunnel at the end of the transport line (northern portal) was approx. 10 liters per second. The conditioning agent dosage was determined on the basis of this volume and the factors previously mentioned, using the following formula in which M=quantity of Nalco 7311 Plus (in ppm) and $S_R$= Ryznar stability index, which applies to $3<S_R<7$ and for both ground and seepage waters:

$$M = \frac{e^{(7.5-S_R)}}{2} + 4$$

For 40 days, a constant amount of 6.3 g of the conditioning agent per cubic meter was fed in drop form into the righthand transport line. At the same time, no conditioning agent was added to the lefthand transport line. The conditioning agent was a mixture of Na salts of polycarboxylic acids and phosphonocarboxylic acids (Nalco 7311 Plus ®). To check on the effect, a total of 14 cement bricks (10×10×25 cm) were placed at approx. 250 m intervals in the shafts of both transport lines at the time the test was started (start of addition of conditioning agent). After 40 days, the cement bricks were removed from the shafts and tested qualitatively for newly formed deposits. At the same time, water samples were taken at the same locations for chemical analysis. The following table summarizes the most important results.

| Cement brick no.; distance to collecting shaft at northern portal | Chem. analysis of water samples from left transport line (w/o dosage) | Chem. analysis of water samples from right transport line (w/dosage) | Qual. evaluation of deposits on cement bricks from left transport line (w/o dosage) | Qual. evaluation of deposits on cement bricks from right tr. line (w/dosage) |
| --- | --- | --- | --- | --- |
| No. 1 approx. 1500 m | no Nalco 7311 Plus; Ca hardness 13.1° dH | 15 mg/l Nalco 7311 Plus Ca hardness 13.1° dH | no visible deposits | no visible deposits |
| No. 2 approx. 1250 m | | | reddish discolouration | reddish discolouration |
| No. 3 approx. 1000 m | | | reddish discolouration | reddish discolouration |
| No. 4 approx. 750 m | no Nalco 7311 Plus; Ca hardness 11.8° dH | 15 mg/l Nalco 7311 Plus Ca hardness 12.7° dH | light-red soft deposits | no deposits |
| No. 5 approx. 500 m | no Nalco 7311 Plus; Ca hardness 11.9° dH | 11 mg/l Nalco 7311 Plus Ca hardness 13.1° dH | light-red soft deposits | no deposits |
| No. 6 approx. 250 m | | | light-red hard deposits, 1.5 to 2 mm thick | no deposits |
| No. 7 approx. 50 m | no Nalco 7311 Plus; Ca hardness 11.0° dH | 8 mg/l Nalco 7311 Plus Ca hardness 13.2° dH | light-red hard deposits, 1.5 to 2 mm thick | red discolouration only; no deposits |

The effect is evident from a consideration of the Ca hardness values measured on the various mountain water samples. In the lefthand transport line (without conditioning agent added), the Ca hardness of the mountain water decreased from the original approx. 13°dH dissolved in the mountain water to 11.8°dH in the middle of the tunnel, increased slightly to 11.9°dH (500 m before the end of the transport line) and then decreased again to 11.0°dH (50 m before the end of the transport line) in the area of the northern portal. Especially in this area, the 1.5 to 2 mm thick hard lime deposits on the cement bricks that had stayed for 40 days in the left transport line confirm the decrease in Ca hardness.

In the righthand drainage line (with conditioning agent added), the Ca hardness values measured in the mountain water (12.7°dH, 13.1°dH and 13.2°dH) clearly are higher. At the end of the test reach at cement brick no. 7, the difference of the Ca hardnesses of the mountain water in the righthand and lefthand transport lines was 2°dH. What this means is that by adding the conditioning agent as desribed in this example the formation of hard deposits in the transport line on the order of 36 g $CaCO_3$ per cubic meter of mountain water had been prevented. By adding 6.3 g Nalco 7311 Plus R̂ per cubic meter to the righthand transport line at cement brick No. 7, a product concentration of 8 mg was obtained per liter of mountain water.

I claim:

1. A process for preventing scale formation in a construction drainage system, comprising addition in liquid form of 0.1 to 100 g per cubic meter of infiltration or ground water of a conditioning agent or mixtures thereof from a dosage unit via a feed line into the construction drainage system, preferably at the highest point of the seepage pipe, to the infiltration or ground water by controlling the dosage of conditioning agent in dependence on the flow of water at the end of the construction drainage system.

2. The process according to claim 1, wherein the dosage unit has a service water inlet to enable the conditioning agent to be diluted in any ratio with service water for subsequent feeding into the construction drainage system.

3. The process of claim 1 further comprising adding to the infiltration or ground water as conditioning agent a compound selected from the group consisting of inorganic condensed phosphates, phosphate esters, polyphosphoric acid esters, aminophosphates, aminomethylenephosphoric acids, N-containing phosphonates, aminoalkylenephosphonic acids, phosphonocarboxylic acids, succinic acid amide, polysaccharides, gluconates, polyglycosides, polyglucosides, and the derivatives thereof, polyoxycarboxylic acids, and the copolymers thereof, proteins, polyaspartic acid, and silicates.

4. The process of claim 1 further comprising adding to the infiltration or ground water as conditioning agent a compound selected from the group consisting of lignin sulphonates, sulphonated condensation products of naphthalene with formaldehyde, polyacrylates, polymethacrylates, polyacrylamides, copolymers of acrylic acid or methacrylic acid and acrylamide, phosphinic acid-containing homo- and copolymers of acrylic acid and acrylamide, oligomeric phosphinico-succinic acid compounds, sulphomethylated or sulphoethylated polyacrylamides and copolymers or terpolymers with acrylic acid and maleic acid esters, N-butylacrylamide and the copolymers thereof, acrylamidopropionosulphonic acid and the copolymers thereof, maleic acid anhydride polymers and copolymers, phosphinoalkylated acrylamide polymers and copolymers with acrylic acid, citric acid, ether carboxylates, and oxidized carbohydrates.

5. The process of claim 1 further comprising adding to the infiltration or ground water as conditioning agent a compound selected from the group consisting of phosphonocarboxylic acids, aminoalkylene phosphonic acids, aminophosphonates, and acrylate-based polymers.

6. The process of claim 1 further comprising adding to the infiltration or ground water as conditioning agent a compound selected from the group consisting of phosphonobutane tricaboxylic acid, polyacrylates, polymethacrylates, acrylamides, sulphonated polyacrylic homo- and copolymers, succinic acid amide, and oligomeric phosphinicosuccinic acid compounds.

7. The process of claim 1 further comprising adding to the infiltration or ground water as conditioning agent a mixture of phosphonocarboxylic acids and polycarboxylic acids in the form of the water-soluble salts thereof in an aqueous solution in amounts of 0.5 to 50 g per cubic meter of infiltration or ground water.

8. The process of claim 1 wherein the construction drainage system is disposed within a structure selected from the group consisting of buildings, tunnel structures, galleries, caverns, barrages, retention basins, hydroelectric power plants, retention walls and roadways.

* * * * *